(12) United States Patent
Mukouyama et al.

(10) Patent No.: US 6,300,105 B1
(45) Date of Patent: Oct. 9, 2001

(54) METHODS FOR PRODUCING A SUCCINIMIDE POLYMER, AN ASPARTIC ACID POLYMER AND L-ASPARTIC ACID

(75) Inventors: Masaharu Mukouyama, Tsukuba-gun; Shinzo Yasuda, Ushiku, both of (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

(21) Appl. No.: 09/360,092

(22) Filed: Jul. 23, 1999

(30) Foreign Application Priority Data

Jul. 23, 1998 (JP) .................................................. 10-207505
Jul. 23, 1998 (JP) .................................................. 10-207506

(51) Int. Cl.[7] ............................. C12P 13/20; C12P 13/00; C12N 11/10; C12N 11/08; C08G 69/10
(52) U.S. Cl. ......................... 435/109; 435/106; 435/128; 435/178; 435/180; 435/849; 435/876; 528/328
(58) Field of Search .................................... 435/174, 177, 435/180, 106, 109, 128, 849, 876; 528/328

(56) References Cited

U.S. PATENT DOCUMENTS 5,541,090 * 7/1996 Sakano et al. ....................... 435/109
5,688,904 11/1997 Wood et al. ......................... 528/328

FOREIGN PATENT DOCUMENTS

| 44 29 108 A1 | 2/1996 | (DE) . |
| 0 705 794 A2 | 4/1996 | (EP) . |
| 0 902 010 A1 | 3/1999 | (EP) . |
| 08-302009 | 11/1996 | (JP) . |
| WO 98/30712 | 7/1998 | (WO) . |

* cited by examiner

*Primary Examiner*—David M. Naff
(74) *Attorney, Agent, or Firm*—Fish & Richardson P.C.

(57) ABSTRACT

A succinimide polymer is produced by thermally polymerizing an ammonium salt of aspartic acid in the presence of an acid catalyst such as a boric acid catalyst. Another amino acid may be added for copolymerizing with the ammonium salt of aspartic acid. Ammonia liberated during the production of a succinimide polymer can be collected in a fumaric acid suspension, an acidic fumaric acid solution, a maleic acid solution or an acidic maleic acid solution, and the resultant liquid reacted with an enzyme which may be immobilized to produce L-aspartic acid. An aspartic acid polymer is produced by hydrolyzing the succinimide polymer with a basic substance.

22 Claims, 1 Drawing Sheet

METHODS FOR PRODUCING A SUCCINIMIDE POLYMER, AN ASPARTIC ACID POLYMER AND L-ASPARTIC ACID

BACKGROUND OF THE INVENTION

1. Field of the Invention

This invention relates to a method for the production of a succinimide type polymer and an aspartic acid type polymer.

2. Description of the Related Art:

A succinimide type polymer, when hydrolyzed, gives rise to a corresponding succinimide type polymers which are useful as detergent additives, dispersion stabilizers, scale preventing agents, humectants, and fertilizers.

As means to obtain polysuccinimide by thermal polymerization of aspartic acid as the raw material, various methods have been heretofore proposed.

German Patent publication DE4429108 A1 discloses a method for effecting polymerization of aspartic acid by vacuum concentrating the ammonium salt solution of aspartic acid and further heating the resultant concentrate.

According to this method, the yield of polysuccinimide is 30% when the polymerization temperature is 180° C. and the polymerization time is 4 hours. To heighten the polymer yield, this method requires the polymerization temperature to rise to 220° C. Further, the polyaspartic acid that has been obtained by this method has the problem of deficiency in biodegradability.

EP 0 705 794 A2 discloses a method for polymerizing aspartic acid in the presence of an acid catalyst. This method uses an acid form aspartic acid as the raw material. Since aspartic acid is generally produced in the form of a solution, the method requires separating the acid form aspartic acid in advance from the solution prior to the actual use of the aspartic acid. This extra treatment of separation has formed a cause for heightening the cost of production.

SUMMARY OF THE INVENTION

An object of the present invention is to provide an efficient method for the production of a succinimide type polymer excelling in biodegradability.

Another object of the present invention is to provide an efficient method for the production of an aspartic acid type polymer by the use of a succinimide type polymer.

According to the present invention, it can provide a method for the production of a succinimide type polymer, which comprises thermally polymerizing an ammonium salt of amino acids having aspartic acid as an essential component thereof in the presence of an acid catalyst.

According to the present invention, it can provide a method for the production of an aspartic acid type polymer, which comprises hydrolysing the produced succinimide type polymer by causing the polymer to contact a basic substance.

According to the present invention, it can provide a method for the production of a succinimide type polymer by the polymerization treatment of a solution of an ammonium salt of amino acid containing aspartic acid as an essential component thereof, which method comprises reclaiming the ammonia liberated during the polymerization as the raw material for L-aspartic acid.

This invention further concerns a method for the production of an aspartic acid type polymer, which comprises hydrolysing the produced succinimide type polymer by causing the polymer to contact a basic substance.

Since this method uses an acid catalyst, it can lower the polymerization temperature and shortens the polymerization time. It, therefore, offers the advantage that the polyaspartic acid type polymer derived from the resultant polysuccinimide type polymer has high biodegradability. Further, the ammonia liberated during the process of polymerization can be recovered and reclaimed as the raw material for L-aspartic acid. Particularly, when this liberated ammonia is collected with a suspension of fumaric acid, i.e. the raw material for the L-aspartic acid, the ammonia so collected can be advantageously used as the raw material for the L-aspartic acid.

When the acid catalyst is added to the ammonium salt solution of L-aspartic acid, the effect as acid of this catalyst is ceases to exist because counter ions are generally linked to an acid of high acid strength. Ammonium sulfate is formed as by sulfuric acid and it is not decomposed unless the temperature is higher than 280° C. Thus, the sulfuric acid catalyst ceases to function as an acid catalyst. It has been unexpectedly found that, when a comparatively weak acid such as phosphoric acid or boric acid is used, the resultant ammonium salt of the acid exhibits a comparatively low decomposition temperature, as evinced by the fact that ammonium phosphate decomposes at 190° C. to form free phosphoric acid and consequently enables the decomposed phosphoric acid to retain the catalytic function. Boric acid can be similarly utilized as a catalyst. By the addition of acid catalyst to the ammonium salt solution of aspartic acid, the polysuccinimide of a high molecular weight can be efficiently produced even at a low application rate of the acid catalyst because this addition enables the acid catalyst to be dissolved and dispersed homogeneously throughout the entire volume of the solution.

DESCRIPTION OF THE PREFERRED EMBODIMENT

Figure 1:
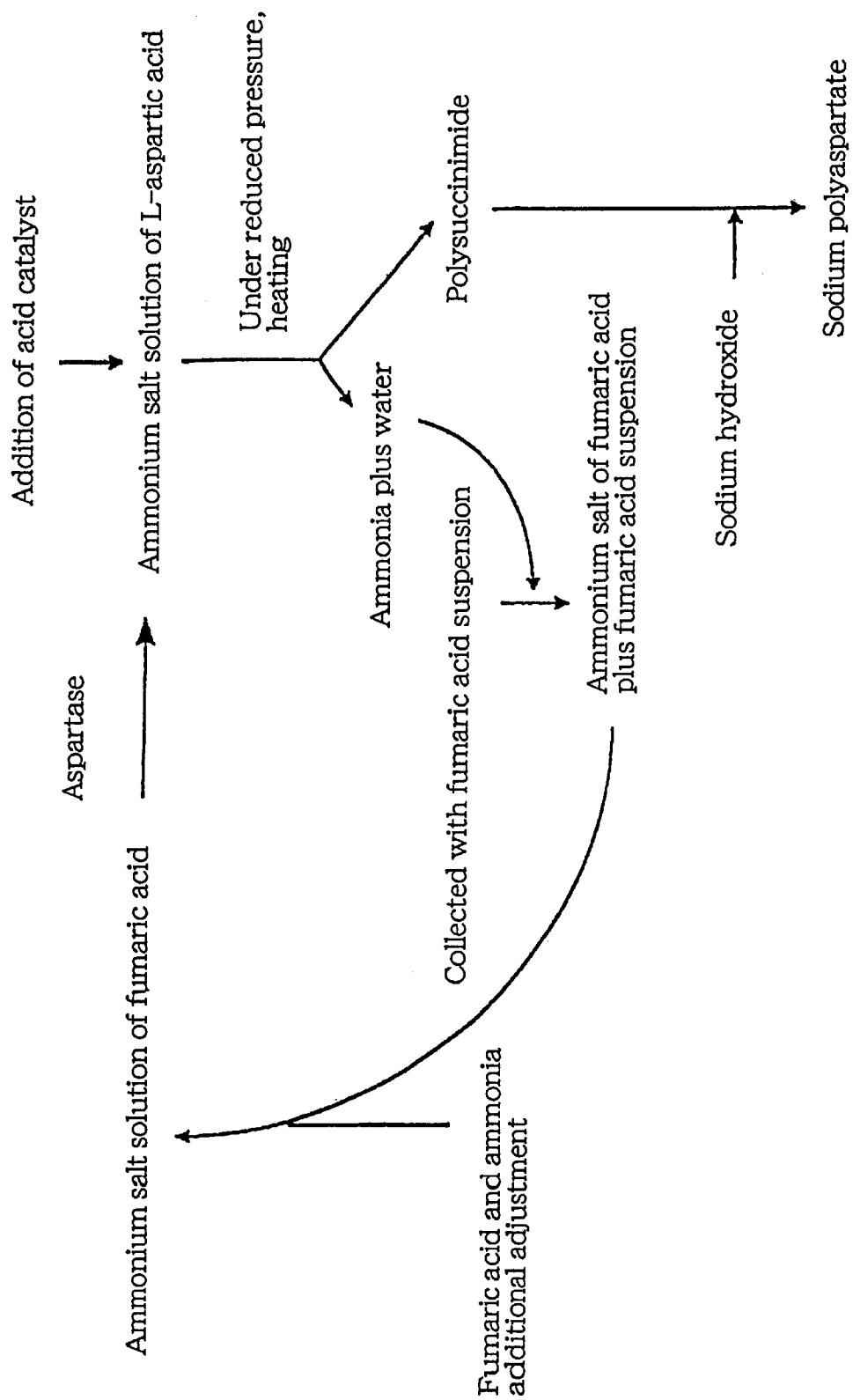
FIG. 1 is a schematic diagram illustrating a method for the production of polysuccinimide and polysodium aspartate from ammonium L-aspartate as the raw material.

The invention will be better understood and objects, features, and advantages thereof other than those set forth above will become apparent from the following detailed description of the preferred embodiment.

This invention uses, as the raw material, an amino acid in which aspartic acid is an essential component thereof. The aspartic acid to be used herein embraces an L-form, a D-form, and the mixture thereof. The amino acid is allowed to incorporate therein, besides the aspartic acid, one or more amino acids in an amount up to 100% by weight, based on the weight of the aspartic acid, prior to polymerization. As concrete examples of the amino acid to be copolymerized with the aspartic acid, glycine, alanine, asparagine, glutamic acid, lysine, valine, leucine, isoleucine, phenyl alanine, methionine, histidine, proline, serine, threonine, and cysteine maybe cited. Among them, glutamic acid, lysine, methionine and cysteine may be preferably cited.

The ammonium salt solution of aspartic acid is preferred to be used in this invention in a concentration in the range of 5–50%. It is particularly advantageous to use the ammonium salt solution of L-aspartic acid obtained from fumaric acid and ammonia by the action of an aspartase thereon in its freshly produced state. By preparatorily vacuum concentrating this solution, the solution can be used in a form having a concentration at a heightened level in the range of 50–90%.

In this invention, the acid catalyst can be used in a form having the effect of a free acid or an acid at the reaction temperature in the presence of ammonium ions.

Generally, when a strong acid is added to the ammonium salt solution of L-aspartic acid, the acid thus added deprives the ammonium ions from the salt and forms the ammonium salt of its own. When sulfuric acid is used for this addition, for example, it is converted to ammonium sulfate. The sulfuric acid that has assumed the form of an ammonium salt in this manner no longer has the effect of an acid catalyst capable of increasing the velocity of polymerization. Even in the neighborhood of 220° C., i.e. the polymerization temperature, the ammonium sulfate defies decomposition and continues to exist stably. According to the Handbook of Chemistry, the decomposition temperature of ammonium sulfate is not lower than 280° C.

Incidentally, it is recognized that when a comparatively weak acid such as phosphoric acid or boric acid is used, the yield of polysuccinimide is improved evidently in consequence of a decrease of the polymerization temperature and an increase of the polymerization velocity. It has been further demonstrated that the polyaspartic acid that is derived from the produced polysuccinimide is improved in biodegradability. It is inferred that the ammonium salt of such a comparatively weak acid decomposes in the neighborhood of the polymerization temperature and forms a free acid. Encyclopaedia Chimica 9 (published by Kyoritsu Shuppan in Japan) carries a statement that, when an ammonium phosphate solution is heated, the salt therein loses two molecules of ammonia and forms ammonium dihydrogen phosphate. Handbook of Chemistry, Basic Volume I (published by Maruzen in Japan) carries a statement that the decomposition temperature of ammonium dihydrogen phosphate is 155° C. and the decomposition temperature of ammonium dihydrogen phosphate is 190.5° C. It is inferred that, when a comparatively weak acid is heated to a temperature of 150 to 220° C., the polymerization temperature, the produced ammonium salt loses ammonia and converts to a form having a catalytic function, and hence the polymerization temperature will decrease and the polymerization velocity will increase. In spite of the absence of any knowledge about the decomposition temperature of ammonium borate, the information purporting that the dissociation constant of boric acid, pKa, is 9.24 and the pH of the ammonium salt solution of L-aspartic acid obtained by an enzymatic reaction falls in the range of 8 to 9, is believed to imply that a considerable part of boric acid will not be changed even in this pH range. When such an acid that decomposes the ammonium salt thereof at the polymerization temperature or assumes the form of an acid even in the presence of ammonium ions, the polymerization temperature can be decreased and the polymerization velocity can be increased.

The acid that can function as the catalyst is not allowed to arbitrarily select. Properly, the acid has a characteristic property of decomposing the ammonium salt thereof in the neighborhood of the polymerization temperature or inherently assuming the form of an acid even in the presence of ammonium ions. Particularly, it is allowable to use, as the acid catalyst, a phosphoric acid derivative having at least one P—OH bond, a boric acid derivative having at least one B—OH bond therein, ammonium carbonate, ammonium hydrogen carbonate or carbon dioxide. As examples of suitable phosphoric acid derivatives to be used herein, phosphoric acids such as orthophosphoric acid, metaphosphoric acid, and polyphosphoric acid; acid phosphoric esters such as methyl phosphoric acid, ethyl phosphoric acid, and phenyl phosphoric acid; and ammonium salts thereof may be cited. As examples of suitable boric acid derivatives to be used herein, boric acids such as orthoboric acid, metaboric acid, and tetraboric acid; ammonium salts thereof; boric esters with alkyl alcohols such as ethyl alcohol and methyl alcohol; and boric acid complexes with polyhydric alcohols may be cited. Since the polymer which is obtained by polymerization is fated to be used as a biodegradable material, it is commendable to use as the catalyst either boric acid which has only a small environmental impact or phosphoric acid which is usable also as a fertilizer component.

Properly, the amount of acid catalyst to be used is in the range of 0.5 to 40% by weight, preferably 1 to 30% by weight, and more preferably 2 to 15% by weight, based on the amount of the amino acid as the raw material. If the amount of the acid catalyst is unduly small, the reaction time will be lengthened and the polymer of a high molecular weight will not be obtained. If the amount of the acid catalyst is conversely unduly large, the excess acid catalyst will persist in a large amount in the produced polymer, degrade the quality of the product, and cause an increase in the cost.

The acid catalyst may be added directly to the ammonium salt of the amino acid having aspartic acid as an essential component that occurs during the initial stage of the reaction or to the ammonium solution after it has been vacuum concentration to a certain extent. Since the acid catalyst is enabled by the addition thereof to the solution to be uniformly dispersed and dissolved in the solution, the acid catalyst to be used at a small application rate suffices to attain efficient production of the polysuccinimide of a high molecular weight.

Since this method uses the acid catalyst, the polymerization temperature can be lowered and the polymerization time can be shortened. As a result, the aspartic acid type polymer that is derived from the produced succinimide type polymer has the advantage of high biodegradability.

Properly, the polymerization temperature is in the range of 100–250° C., preferably 100–215° C., and more preferably 130–210° C. If the polymerization temperature is unduly low, the polymerization will not proceed. If the polymerization temperature is unduly high, the produced is polymer will entail the disadvantage of forming therein a complicated structure having adverse effects on the biodegradability of the polymer. The polymerization time is generally in the range of 0.5–8 hours when the polymerization temperature is in the neighborhood of 210° C.

Preferably during the course of the polymerization, the pressure reduction is utilized for facilitating the removal of the water and excess ammonia contained in the ammonium solution of amino acid having aspartic acid as an essential component and the ammonia and the water liberated in consequence of the polymerization. Properly, the degree of pressure reduction during the polymerization is in the range of 1–500 mmHg, preferably 10–400 mmHg, and more preferably 50–300 mmHg. The degree of pressure reduction is preferred to be as high as possible because the increase of this degree results in improving the efficiency of removal of water and ammonia and shortening the polymerization time. The increase of the degree of pressure reduction to an unusually high level, however, entails the problem of complicating the apparatus. If the degree of pressure reduction is unduly low, the efficiency of the removal of water and ammonia will be degraded and the polymerization time will be lengthened.

The application of heat and the reduction of pressure induce liberation of ammonia. This ammonia, when necessary, may be trapped and put to reuse. Particularly, when the liberated ammonia is trapped by means of the suspension of fumaric acid, a raw material for L-aspartic acid, the suspension, after suitable addition of ammonia and fumaric acid thereto, can be reused as a raw material for synthesizing L-aspartic acid from fumaric acid and ammonia by the action of an aspartase.

As the equipment for the reaction relying on the application of heat and the reduction of pressure, various kinds of apparatus such as a tray type vacuum dryer, a belt conveyor type dryer, a drum dryer, and a bent type screw extruder can be used. Since the polymerization entails such a change in the state of aggregate as mentioned above, it is commendable to use a kneader and a bent type screw extruder which are capable of kneading a substance of high viscosity. When the reaction does not need any reduction of pressure, it is commendable to use a belt conveyor type or drum type dryer because this dryer offers a large surface area and facilitates the removal of water and ammonia.

The ammonium salt solution including an amino acid as the raw material assumes a state of solution to viscous syrup during the first stage of polymerization, then assumes a state of starch syrup after the polymerization has advanced and the viscosity has risen gradually, and varies to a solid state when the formation of succinimide structure continues to proceed.

When the polysuccinimide produced by means of polymerization in the invention is dissolved at a temperature in the range of 20–95° C., preferably 40–70° C., for example, in the aqueous solution of a basic substance such as an alkali metal hydroxide or an alkaline earth metal hydroxide, an imide ring in the polysuccinimide is hydrolytically opened and the salt of polyaspartic acid is consequently obtained. The concentration of the basic substance in the aqueous solution is preferred to be in the range of 5–50% by weight. As examples of suitable alkali metal hydroxides, sodium hydroxide and potassium hydroxide may be cited. As examples of suitable alkaline earth metal hydroxides, calcium hydroxide, magnesium hydroxide, and strontium hydroxide may be cited. Among other basic substances mentioned above, sodium hydroxide proves particularly advantageous because it is inexpensive and suitable for such applications as a detergent additive, a dispersion stabilizer, and a scale-preventing agent. For such applications as a fertilizer and a plant growth accelerator, the use of potassium hydroxide is particularly commendable because this basic substance is fated to form a fertilizer component.

The ammonia that has not removed during the course of polymerization is present in the solution of the salt of polyaspartic acid that has undergone the hydrolytic ring opening as mentioned above. It can be expelled from the solution in the form of free ammonia and recovered as such by adjusting the pH of the solution in the range of 9–10 and heating the solution. Again in this case, the practice of trapping the ammonia with the suspension of fumaric acid in the same manner as above is commendable because the suspension can be reclaimed as the raw material for L-aspartic acid.

The molecular weight of polyaspartate can be determined by gel permeation chromatography (GPC) using a column (available from Showa Denko K.K. in Japan and sold under the trademark designation of "Shodex OH Pack Column") based on an aspartic acid sample of a known molecular weight (available from Shigma Corp) as the standard. By the method of this invention, a polyaspartic acid having a weight average molecular weight of not less than 2000 can be produced.

The biodegradability of polyaspartic acid can be measured by the modified MITI test according to the OECD Test Guide Line. By the method of the invention, a polyaspartic acid which, in a test performed with activated sludge from a sewage treating plant for 28 days, exhibits degradability of not less than 60% in terms of the biodegradation ratio determined based on the biochemical oxygen demand (BOD) can be produced.

The succinimide type polymer produced by the invention is caused by hydrolysis to form a corresponding amino acid type polymer. This polymer can be used for such applications as a detergent additive, a dispersion stabilizer, a scale preventing agent, a humectant, and a fertilizer that invariably demand excellent biodegradability.

Then, the ammonia that is generated during the course of polymerization is liberated. The method for reusing this ammonia will be described below.

Ammonia is liberated where the ammonium solution of amino acid having aspartic acid as an essential component thereof, is polymerized by application of heat under a reduced pressure. This ammonia is collected and put to reuse. Since ammonia is generally highly volatile, the collection thereof requires an operation such as cooling. When the ammonia liberated from the reaction system is introduced into a fumaric acid suspension, an acidic fumaric acid solution, a maleic acid solution, or an acidic maleic acid solution, the ammonia can be nearly wholly collected without being cooled. Particularly, when the liberated ammonia is collected with the suspension of fumaric acid, being one of raw materials for L-aspartic acid, this collection is commendable because the collected ammonia is neutralized with the fumaric acid to form the ammonium salt of fumaric acid. The liberated ammonia is, therefore, dissolved in water and in fallibly collected. When maleic acid that is the raw material for fumaric acid is used, it can be used in the form of a solution because maleic acid has high solubility. Likewise in the case of maleic acid, the collected ammonia is neutralized with maleic acid and converted to an ammonium salt of maleic acid and infallibly collected.

The concentration of the fumaric acid suspension, acidic fumaric acid solution, maleic acid solution, or acidic maleic acid solution that is used herein for collecting the generated ammonia is generally in the range of 5–80%, preferably 10–60%.

The amount of fumaric acid or maleic acid to be used herein is generally in the range of 0.4–2 mols, preferably in the range of 0.5–0.6 mol, per mol of the ammonia contained in the ammonium solution of L-aspartic acid. If this amount is less than 0.4 mol, the solution will possibly fail to collect the ammonia. If it exceeds 2 mols, the amount of fumaric acid or maleic acid will be unduly large relative to the amount of ammonia and will prove detrimental in terms of the effective utilization of raw materials. In the case of fumaric acid, when the amount is in the range of 0.45–0.6 mol, the collection of ammonia will possibly enable the suspended fumaric acid to assume a wholly dissolved state.

During the collection of ammonia, the temperature of the fumaric acid suspension, acidic fumaric acid solution, maleic acid solution, or acidic maleic acid solution is proper generally in the range of 5–90° C.

The fumaric acid suspension or the acidic fumaric acid solution that is one of the raw material for L-aspartic acid, or the maleic acid solution or the acidic maleic acid solution as the raw material for fumaric acid is used for collecting the ammonia liberated. Ammonia, fumaric acid, or maleic acid is suitably replenished thereto if necessary. It is made possible to reclaim the resultant solution as the raw material for the synthesis of L-aspartic acid from fumaric acid and ammonia or from maleic acid and ammonia by the action of aspartase or aspartase and a maleic acid isomerizing enzyme. To be specific, the fumaric acid suspension containing the acquired ammonium fumarate is adjusted in the concentration and the pH thereof by adding fumaric acid and/or ammonia and further adding a divalent metal-containing salt such as magnesium sulfate that is an enzyme activating agent, with the result that it serves satisfactorily as the raw material for the enzymatic production of L-aspartic acid. The maleic acid solution containing the acquired ammonium maleate, after adjusting the concentration and the pH thereof by the addition of maleic acid and/or ammonia, further adding a divalent metal-containing salt such as magnesium sulfate which is an enzyme activating agent, and suitably replenishing itself with mercapto ethanol and a deoxidant, serves satisfactorily as the raw material for the production of L-aspartic acid by an enzymatic reaction using a maleic acid isomerizing enzyme and aspartase.

For the purpose of performing the reaction batchwise or continuously by using the aforementioned ammonia containing fumaric acid suspension, acidic fumaric acid solution, maleic acid solution, or acidic maleic acid solution as a raw material and utilizing an immobilized mass of an enzyme such as aspartate or aspartate and maleic acid isomerizing enzyme, it is necessary to adjust the concentration of the fumaric acid or maleic acid and the ratio of the fumaric acid or maleic acid to the ammonia. The concentration is suitably adjusted generally in the range of 5–40% by weight, preferably in the range of 10–30% by weight, as reduced to fumaric acid or maleic acid. Specifically, the adjustment of the concentration can be attained by concentration of the suspension or the solution or replenishing the suspension or the solution with fumaric acid or maleic acid. If the concentration is less than 5%, the shortage will bring the disadvantage of entailing an undue increase in the amount of the water to be removed during the polymerization using the acquired ammonium solution of L-aspartic acid. Conversely, if the concentration exceeds 40%, the excess will bring the disadvantage of possibly entailing precipitation of crystals of fumaric acid and ammonium fumarate.

The ratio of ammonia to fumaric acid or maleic acid is adjusted by the addition of ammonia so that the amount of ammonia may fall in the range of 1.5–3 moles, preferably 2–2.5 moles, per mole of fumaric acid or maleic acid. If the amount of ammonia exceeds 3 mols, the excess will bring the disadvantage of increasing the amount of ammonia to be recovered during the course of the polymerization. The pH of the ammonium fumarate solution or the ammonium maleate solution that has been adjusted as described above generally falls in the range of 8–10.

To furnish the enzymatic reaction with a substrate, it is commendable to add a divalent metal salt that is effective in activating the aspartate. As examples of suitable divalent metal salts, magnesium salts such as magnesium chloride and magnesium sulfate; manganese salts such as manganese chloride; and cobalt salts maybe cited. Properly, the concentration of the divalent metal salt to be added is generally in the range of 1–100 mM, preferably in the range of 5–50 mM.

The addition of a SH reagent such as mercapto ethanol is commendable because this reagent stabilizes the enzymatic activity.

The ammonium fumarate or ammonium maleate which has been adjusted as described above is converted into ammonium L-aspartate in the presence of a microorganism having an aspartase activity or an aspartase activity and a maleic acid isomerizing enzyme activity, a fragmentation thereof, or an enzyme. Such a microorganism exhibiting an aspartase activity or an aspartase activity and a maleic acid isomerizing enzyme activity or enzyme can be used in an immobilized state. Suitable carrier for immobilization is a macromolecular substance such as cellulose, alginic acid, or κ-carrageenan, an ion-exchange resin, or a suitable synthetic macromolecular substance such as polyacryl amide. The immobilization is commendable because it serves the purpose of facilitating separation of the microorganism or enzyme from the product of the reaction and improving the productivity rate.

The microorganism having the aspartate activity imposes no restriction particularly but requires only to possess the aspartase activity. As examples of suitable microorganisms, microorganisms (*Escherichia coli* ATCC11303, ATCC9633, and ATCC27325) belonging to genus Escherichia and microorganisms belonging to genus Brevibacterium may be cited.

As examples of suitable micro-organisms exhibiting maleic acid isomerizing enzyme activity, micro-organisms (such as *Alcaligenes faecalis* ATCC8750) belonging to genus Alcaligenes, micro-organisms (such as *Enterobactor agglomerans* NSM-1 FERMBP-6034) belonging to genus Enterobactor, micro-organisms (such as *Citrobacter freundii* NSM-2 FERMBP-6035 and *Citrobacter amaronaticus* NSM-10 FERMBP-6541) belonging to genus Citrobacter, micro-organisms (such as *Klebsiella planticolla* NSM-3 FERMBP-6036) belonging to genus Klebsiella, and micro-organisms (such as *Pseudomonas fluorescens* NSM-4 FERMBP-6037) belonging to genus Pseudomonas may be cited. These micro-organisms are usable satisfactorily because they are capable of forming L-aspartic acid from maleic acid with a high yield.

It is more suitable where such microorganisms produced by means of a genetic recombination.

The culture medium to be used in the preparation of the micro-organic cells has no restriction particularly but may be any of the ordinary species of culture medium generally used for culturing microorganisms. As carbon sources for the culture medium, saccharides such as glucose, fructose, and sucrose; organic acids such as maleic acid, fumaric acid, malic acid, and acetic acid; and alcohols such as glycerin and ethanol can be used.

As nitrogen sources for the culture medium, inorganic salts such as ammonia, ammonium sulfate, ammonium chloride, ammonium nitrate, and urea can be used and organic nitrogen sources such as peptone, yeast extract, corn steep liquor, and Casamino acid can be used as well. The inorganic salts that are usable herein include potassium monohydrogen phosphate, potassium dihydrogen phosphate, magnesium sulfate, and ferrous sulfate, for example. Vitamins may be suitably added when necessary.

The culture is carried out under aerobic conditions such as aerating agitation and vibration. The culture temperature is generally in the range of 20–40° C., preferably in the range of 28–37° C. The pH of the culture broth is generally in the range of 5–10, preferably in the range of 7–8. The adjustment of the pH is effected by the addition of an acid or an alkali. The concentration of the carbon source in the culture medium at the time of starting the culture is generally in the range of 0.05–10 wt. %, preferably in the range of 0.5–2 wt. %. The duration of the culture is generally in the range of 10 hours to four days, preferably in the range of 15 hours to three days.

The enzymatic reaction using an aspartase or a maleic acid isomerizing enzyme and an aspartase can be carried out batchwise or continuously. The practice of immobilizing micro-organic cells containing the aspartase or the maleic acid isomerizing enzyme and the aspartase, packing a column with the immobilized micro-organic cells, and using these cells for the enzymatic reaction is particularly commendable. Since this method allows the aspartase or the maleic acid isomerizing enzyme and the aspartame to be used for the reaction for a long time, it can obtain ammonium L-aspartate in a larger amount from a fixed amount of the enzyme.

The temperature of the reaction using the enzyme is generally in the range of 5–50° C., preferably in the range of 10–40° C. If this temperature is lower than 5° C., the shortage will bring such disadvantages as decreasing the reaction velocity and possibly inducing precipitation of ammonium fumarate. If the temperature conversely exceeds 50° C., the excess will bring such disadvantages as possibly inactivating the aspartase or the maleic acid isomerizing enzyme and the aspartame. The reaction temperature can be adjusted by cooling the reaction system with a multiple pipe device, a jacket, or an external circulation heat exchanger or by preparatorily lowering the temperature of the solution of an ammonium salt of fumaric acid or maleic acid from 40° C. to a temperature greater than the width through which the temperature will be elevated by the heat of reaction.

Now, the method for the production of polyaspartic acid (salt) from the produced polysuccinimide as the raw material will be described below.

When the polysuccinimide obtained by the polymerization in the invention is dissolved in an aqueous solution of a basic substance, such as an alkali metal hydroxide or an alkaline earth metal hydroxide, for example, at a temperature in the range of 20 to 95° C., preferably in the range of 40 to 70° C., an imide ring in the polysuccinimide is hydrolytically opened, and consequently the polyaspartate is obtained. The concentration of the aqueous solution of the basic substance to be used is preferred to be in the range of 5–50% by weight. The alkali metal hydroxides usable herein include sodium hydroxide and potassium hydroxide, for example, and the alkaline earth metal hydroxides usable herein include calcium hydroxide, magnesium hydroxide, and strontium hydroxide, for example. Among other basic substances mentioned above, sodium hydroxide is inexpensive and particularly suitable for such applications as a detergent additive, a dispersion stabilizer, and a scale-preventing agent. For such applications as a fertilizer and a plant growth accelerator, the use of potassium hydroxide is particularly commendable because this basic substance is fated to form a fertilizer component.

The ammonia that has escaped being removed during the course of polymerization is present in the solution of the salt of polyaspartic acid which has undergone the hydrolytic ring opening as mentioned above. It can be expelled from the solution in the form of free ammonia and recovered as such by adjusting the pH of the solution in the range of 9–10 and heating the solution. Again in this case, the practice of trapping the ammonia with the suspension of fumaric acid in the same manner as above is commendable because the suspension can be reclaimed as the raw material for L-aspartic acid.

FIG. 1 illustrates schematically a method for producing polysuccinimide and polysodium aspartate by using ammonium L-aspartate as a raw material.

The molecular weight of the polyaspartate can be determined by gel permeation chromatography (GPC) using a column (available from Showa Denko K.K. in Japan and sold under the trademark designation of "Shodex OH Pack Column"), with an aspartic acid sample of a known molecular weight (available from Shigma Corp.) as the standard. By the method of the invention, a polyaspartic acid having a weight average molecular weight exceeding 2000, preferably falling in the range of 3000–10000 can be produced.

The biodegradability of polyaspartic acid can be measured by the modified MITI test according to the OECD Test Guide Line. By the method of this invention, a polyaspartic acid which, in a test performed with activated sludge from a sewage treating plant for 28 days, exhibits degradability of not less than 60% in terms of the biodegradation ratio determined based on the biochemical oxygen demand (BOD) can be produced.

The succinimide type polymer produced by the invention is caused by hydrolysis to form a corresponding amino acid type polymer. This polymer can be used for such applications as a detergent additive, a dispersion stabilizer, a scale preventing agent, a humectant, and a fertilizer that invariably demands excellent biodegradability.

In accordance with the present invention, the succinimide type polymer excelling in biodegradability can be produced by a very simple method. Further, the aspartic acid type polymer excelling in biodegradability can be easily produced from the acquired succinimide type polymer.

By the method of the present invention, the succinimide type polymer excelling in biodegradability can be produced with exceptional high efficiency. Further, this method is advantageous in terms of environmental safety and cost because the generated ammonia is recovered and put to reuse.

Further, the aspartic acid type polymer is obtained easily by using this succinimide type polymer.

EXAMPLES

Now, the present invention will be described more specifically below with reference to examples. It should be noted, however, that this invention it not limited to these examples.

Example 1

The ATCC11303 strain of *Escherichia coli* was inoculated to 10 test tubes each containing 3 ml of a culture medium of the composition shown in Table 1 and cultured therein at 37° C. for eight hours. The cultured broths obtained in the test tubes were inoculated one each to 10 Sakaguchi flasks each containing 100 ml of a culture medium of the same composition and shaken cultured at 30° C. overnight. The micro-organic cells were recovered from the resultant culture broth by means of centrifugation. When the cells were tested for aspartame activity, the activity was found to be 0.05 mol L-aspartic acid formed per hour per g of cells.

TABLE 1

| Culture medium composition | |
| --- | --- |
| Fumaric acid | 10 g |
| Ammonium sulfate | 5 g |
| $KH_2PO_4$ | 1 g |
| $K_2HPO_4$ | 3 g |
| $MgSO_4 \cdot 7H_2O$ | 0.5 g |
| NaOH | 6.5 g, pH 6.3 |
| Yeast extract | 20 g |

Sterilized with autoclave at 121° C. for 15 minutes

Seventy (70) g of a liquid prepared by adjusting PAS-880 (available from Nitto Boseki Co., Ltd. in Japan) with an alkali to a pH in the neighborhood of 7.0 and 230 g of deionized water were thoroughly mixed. To the resultant aqueous solution, the micro-organic cells recovered previously were uniformly dispersed. An ion-exchange resin (300 ml, 0.5 mm in average particle diameter, available from Japan Organo Co., Ltd. and sold under the trademark designation of "Amberlite IRA-96SB Cl"), 200 Teflon (tetra fluoro ethylene resin) balls and, ⅙ litter of the dispersion of micro-organic cells previously obtained were placed on an eggplant type flask having an inner volume of 6 liters. They were swirled together at 30° C. and dried by the use of an evaporator for one hour, with the result that the ion-exchange resin was coated with the micro-organic cells. This procedure was performed up to six repetitions and then the Teflon balls were removed to obtain beads of immobilized aspartase. The activity of the immobilized aspartase was found to be 210 U/ml.

The immobilized aspartase thus prepared was left immersed in an aqueous 20% ammonium fumarate solution (pH 8.3) overnight at 4° C. Then, a column was packed with 10 ml of the wetted immobilized aspartase and the column was coated on the outer face with an insulating material of foamed polystyrene to complete an insulated reactor. The column was set operating for continuous reaction by feeding to the column a substrate solution kept at 20° C. in a constant temperature bath at 20° C. via a Teflon tube wrapped with an insulating material at a flow rate of 5 ml per hour (SV=0.5). Such a substrate solution contains 200 g of fumaric acid, 200 g of an aqueous 25% ammonia solution, and 0.25 g of $MgSO_4.7H_2O$ per liter of water and was adjusted with ammonia to pH3. When the reaction solution forming three hours after the start of the reaction was analyzed, it was found to have formed L-aspartic acid in a nearly equi-mol amount to the consumed fumaric acid. The conversion rate of reaction was 99.77%.

In a vat made of stainless steel, 500 ml of the ammonium L-aspartate solution (containing ammonium L-aspartate, water, and 114.3 g of L-aspartic acid) produced through the column was placed and mixed with 11 g of ortho-phosphoric acid. Then, the produced mixture was heated under a reduced pressure in a vacuum dryer at 210° C. for eight hours. The pressure reduction was effected by the evacuation with a diaphragm type vacuum pump, with the degree of pressure reduction adjusted to 150 mmHg. The effluent gas was passed through a suspension containing 60 g of fumaric acid and 60 ml of water to collect ammonia. After four hours of the reaction, the fumaric acid was found to have wholly dissolved by the ammonia liberated in consequence of the polymerization. The amount of the solution was about 500 ml. The amount of the polysuccinimide obtained by the polymerization was 97 g.

Ten (10) g of this polysuccinimide was suspended in 70 ml of water and, by the addition of an aqueous 10 N sodium hydroxide solution to the resultant suspension, the polysuccinimide in the suspension was dissolved and the pH of the suspension was adjusted to 10. The resultant solution was heated to 90° C. and the gas phase part thereof was blown with nitrogen gas to expel the residual ammonia, with the emanating nitrogen gas passed through the suspension mentioned above. As a result, an aqueous solution of polysodium aspartate was obtained. When this solution was analyzed by HPLC, no peak of aspartic acid was detected. The yield of the polymer was nearly 100%.

The weight average molecular weight of the polysodium aspartate was determined by the GPC analysis using a column (available from Showa Denko K.K. in Japan and sold under the trademark designation of "Shodex OH Pack Column"), with an polyaspartic acid sample (Shigma P3418, Shigma P5387, Shigma P3056, or Shigma P6762) of a known molecular weight made by Shigma Corp. as the standard, and it was found to be about 7000. The polysodium aspartate solution was flowed through a cellophane tube and dialyzed therethrough for 16 hours to be deprived of a low molecular weight fraction and the solution emanating from the tube was freeze dried to recover polysodium aspartate. The polyaspartic acid resulting from the treatment of dialysis was tested for biodegradability by following the procedure of the modified MITI test while using return sludge to the urban sewage treating plant instead. To be specific, the polyaspartic acid for test was added to adjust a concentration of 100 ppm to 200 ml of a basic culture solution including a composition defined in the paragraph of biochemical oxygen demand in JIS (Japanese Industrial Standard) K-0102 and activated sludge was also added thereto to adjust a concentration of 30 ppm. Then, the basic culture solution was placed in a dark place and kept stirred therein at 25° C. for 28 hours to effect necessary culture. During the course of the culture mentioned above, the amount of oxygen consumed by the activated sludge was measured periodically to obtain a biochemical oxygen demand curve.

The biodegradation rate (%) was calculated in accordance with the following formula.

$$\text{Biodegradation rate } (\%) = \{(A-B)/C\} \times 100$$

wherein

A: the biochemical oxygen demand, A (mg), of the test substance obtained from the BOD curve mentioned above, B: the amount of oxygen consumption, B (mg), in the basic culture solution, i.e. the blank obtained from the BOD curve, and C: the theoretical oxygen demand (TOD), C (mg), on the basis of the ratio of the following formula to the theoretical oxygen demand (TOD) of the test substance.

The decrease of the theoretical organic carbon (TOC) in the test solution was measured by the use of a TOC tester (made by Shimadzu Seisakusho Ltd. in Japan and sold under the product code of "TOC-500"). The rate of TOC removal was calculated in accordance with the following formula.

$$\text{Rate of TOC removal } (\%) = \{(C_O - C_{BO}) - (C_{28} - CB_{28})/(C_O - C_{BO})\} \times 100$$

wherein $C_O$: TOC in test solution at the start of the test (mg/l)

$C_{28}$: TOC in test solution after elapse of 28 days (mg/l)

$C_{BO}$: TOC in system containing no test substance (blank test solution) at start of the test (mg/l)

$C_{B28}$: TOC in system containing no test substance (blank solution) after elapse of 28 days (mg/i)

The biodegradation rate during the period of 28 days was 60.3%.

The fumaric acid solution that had collected ammonia generated during the polymerization was concentrated under a reduced pressure to 300 ml. The concentrated solution was replenished with 40 g of fumaric acid, 77.5 g of 25% ammonia, and 0.13 g of $MgSO_4.7H_2O$ to a pH 8.3 and a volume of 500 ml. The resultant solution was flowed through the column packed with the immobilized aspartase at a flow rate of 5 ml (SV=0.5) in the same manner as above to effect a continuous reaction. When the reaction solution was analyzed three hours after the start of the reaction, it was found to have formed L-aspartic acid in a nearly equimol amount to the consumed fumaric acid. The conversion rate of reaction was 99.7%. The ammonia collected as described above could be reused in the subsequent cycle of the enzymatic reaction with aspartase.

Example 2

The polymerization was carried out by following the procedure of Example 1 while using 500 ml of an ammonium salt solution of D, L-aspartic acid (23% as aspartic acid, pH 8.3, neutralized with ammonia) in place of the solution that had undergone the enzymatic reaction in the column.

The resultant polysuccinimide was converted to polysodium aspartate in the same manner as in Example 1. When the weight average molecular weight of this product was determined by the GPC, it was found to be about 7000. When this solution was analyzed by the HPLC, no peak of aspartic acid was detected. The yield of polymerization was nearly 100%.

The polysodium aspartate was dialyzed in the same manner as in Example 1 and then tested for biodegradability. The biodegradation rate during the period of 28 days was found to be 60.3%.

The fumaric acid solution that had collected ammonia was readjusted and used for the continuous reaction with the immobilized aspartase in the same manner as in Example 1. When the reaction solution was analyzed three hours after the start of the reaction, it was found to have formed L-aspartic acid in a nearly equimol amount to the consumed fumaric acid. The conversion rate of reaction was 99.6%. The ammonia thus collected could be reused in the subsequent cycle of the enzymatic reaction with the aspartase.

Example 3

The polymerization was performed according to the procedure of Example 1 while using 11 g of boric acid instead as an acid catalyst. The resultant polysuccinimide was converted to polysodium aspartate in the same manner as in Example 1. When the weight average molecular weight of this product was determined by the GPC, it was found to be about 7000. When this solution was analyzed by the HPLC, no peak of aspartic acid was detected. The yield of polymerization was nearly 100%.

The polysodium aspartate was dialyzed in the same manner as in Example 1 and then tested for biodegradability. The biodegradation rate during the period of 28 days was found to be 61.7%.

The fumaric acid solution that had collected ammonia was readjusted and used for the continuous reaction with the immobilized aspartase in the same manner as in Example 1. When the reaction solution was analyzed three hours after the start of the reaction, it was found to have formed L-aspartic acid in a nearly equimol amount to the consumed fumaric acid. The conversion rate of reaction was 99.7%. The ammonia thus collected could be reused in the subsequent cycle of the enzymatic reaction with the aspartase.

Comparative Example 1

The polymerization was performed by following the procedure of Example 1 while omitting the use of a catalyst and changing the polymerization time to 18 hours. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 82%. The polysodium aspartate was dialyzed in the same manner as in Example 1 and then tested for biodegradability. The biodegradation rate during the period of 28 days was found to be 45.5%.

Comparative Example 2

The polymerization was performed according to the procedure of Example 1 while using sulfuric acid as an acid catalyst instead. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 68%. The polysodium aspartate was dialyzed in the same manner as in Example 1 and then tested for biodegradability. The biodegradation rate during the period of 28 days was found to be 41.8%.

Example 4

The polymerization was performed by following the procedure of Example 1 while changing the polymerization temperature to 190° C. The polysuccinimide consequently obtained was converted to polysodium aspartate in the same manner as in Example 1. When the weight average molecular weight of this product was determined by the GPC, it was found to be about 7000. When this solution was analyzed by the HPLC, no peak of aspartic acid was detected. The yield of polymer was nearly 100%.

The polysodium aspartate was dialyzed in the same manner as in Example 1 and then tested for biodegradability. The biodegradation rate during the period of 28 days was found to be 62.3%.

The fumaric acid solution that had collected ammonia was readjusted and used for the continuous reaction with the immobilized aspartase in the same manner as in Example 1. When the reaction solution was analyzed three hours after the start of the reaction, it was found to have formed L-aspartic acid in a nearly equimol amount to the consumed fumaric acid. The conversion rate of reaction was 99.5%. The ammonia thus collected could be reused in the subsequent cycle of the enzymatic reaction with the aspartase.

Example 5

The polymerization was performed according to the procedure of Example 4 while using 11 g of boric acid instead as an acid catalyst. The polysuccinimide consequently obtained was converted to polysodium aspartate in the same manner as in Example 1. When the weight average molecular weight of this product was determined by the GPC, it was found to be about 7000. When this solution was analyzed by the HPLC, no peak of aspartic acid was detected. The yield of polymer was nearly 100%.

The polysodium aspartate was dialyzed in the same manner as in Example 1 and then tested for biodegradability. The biodegradation rate during the period of 28 days was found to be 62.8%.

The fumaric acid solution that had collected ammonia was readjusted and used for the continuous reaction with the immobilized aspartase in the same manner as in Example 1. When the reaction solution was analyzed three hours after the start of the react ion, it was found to have formed L-aspartic acid in a nearly equimol amount to the consumed fumaric acid. The conversion rate of reaction was 99.5%.

The ammonia thus collected could be reused in the subsequent cycle of the enzymatic reaction with the aspartase.

Example 6

The polymerization was performed by following the procedure of Example 4 while changing the polymerization temperature to 180° C. The polysuccinimide consequently obtained was converted to polysodium aspartate in the same manner as in Example 1. When the weight average molecular weight of this product was determined by the GPC, it was found to be about 7000. When this solution was analyzed by the HPLC, no peak of aspartic acid was detected. The yield of polymer was nearly 100%.

The polysodium aspartate was dialyzed in the same manner as in Example 1 and then tested for biodegradability. The biodegradation rate during the period of 28 days was found to be 63.5%.

The fumaric acid solution that had collected ammonia was readjusted and used for the continuous reaction with the immobilized aspartase in the same manner as in Example 1. When the reaction solution was analyzed three hours after the start of the reaction, it was found to have formed L-aspartic acid in a nearly equimol amount to the consumed fumaric acid. The conversion rate of reaction was 99.7%. The ammonia thus collected could be reused in the subsequent cycle of the enzymatic reaction with the aspartase.

Example 7

The polymerization was performed according to the procedure of Example 6 while using 11 g of boric acid instead as an acid catalyst. The polysuccinimide consequently obtained was converted to polysodium aspartate in the same manner as in Example 1. When the weight average molecular weight of this product was determined by the GPC, it was found to be about 7000. When this solution was analyzed by the HPLC, no peak of aspartic acid was detected. The yield of polymer was nearly 100%.

The polysodium aspartate was dialyzed in the same manner as in Example 1 and then tested for biodegradability. The biodegradation rate during the period of 28 days was found to be 62.8%.

The fumaric acid solution that had collected ammonia was readjusted and used for the continuous reaction with the immobilized aspartase in the same manner as in Example 1. When the reaction solution was analyzed three hours after the start of the reaction, it was found to have formed L-aspartic acid in a nearly equimol amount to the consumed fumaric acid. The conversion rate of reaction was 99.7%. The ammonia thus collected could be reused in the subsequent cycle of the enzymatic reaction with the aspartase.

Example 8

The polymerization was performed according to the procedure of Example 4 while changing the polymerization temperature to 170° C. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 53%.

The polysodium aspartate was dialyzed in the same manner as in Example 1 and then tested for biodegradability. The biodegradation rate during the period of 28 days was found to be 63.5%.

Example 9

The polymerization was performed according to the procedure of Example 8 while using 11 g of boric acid instead as an acid catalyst. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 79%.

The polysodium aspartate was dialyzed in the same manner as in Example 1 and then tested for biodegradability. The biodegradation rate during the period of 28 days was found to be 63.5%.

Comparative Example 3

The polymerization was performed by following the procedure of Example 4 while omitting the use of an acid catalyst. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 60%.

Comparative Example 4

The polymerization was performed according to the procedure of Example 4 while using 11 g of sulfuric acid instead as an acid catalyst. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 60%.

Comparative Example 5

The polymerization was performed according to the procedure of Example 6 while omitting the use of an acid catalyst. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 35%.

Comparative Example 6

The polymerization was performed according to the procedure of Comparative Example 5 while using 11 g of sulfuric acid instead as an acid catalyst. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 48%.

Comparative Example 7

The polymerization was performed according to the procedure of Example 8 while omitting the use of an acid catalyst. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 25%.

Comparative Example 8

The polymerization was performed by following the procedure of Comparative Example 7 while using 11 g of sulfuric acid instead as an acid catalyst. The polysuccinimide consequently obtained was converted to polysodium aspartate in the same manner as in Example 1. When the weight average molecular weight of this product was determined by the GPC, it was found to be about 7000. When this solution was analyzed by the HPLC, a residue of aspartic acid was detected. The yield of polymer was 30%.

Comparative Example 9

The polymerization was performed according to the procedure of Example 1 while changing the polymerization temperature to 160° C. The polysuccinimide consequently obtained was converted to polysodium aspartate in the same manner as in Example 1. When the polysodium aspartate was analyzed by the HPLC, a residue of aspartic acid was detected. The yield of polymer was 22%.

Comparative Example 10

The polymerization was performed by following the procedure of Example 3 while changing the polymerization temperature to 160° C. The polysuccinimide consequently obtained was converted to polysodium aspartate in the same manner as in Example 1. When the polysodium aspartate was analyzed by the HPLC, a residue of aspartic acid was detected. The yield of polymer was 7.5%.

Comparative Example 11

The polymerization was performed according to the procedure of Comparative Example 1 while changing the polymerization temperature to 160° C. The polysuccinimide consequently obtained was converted to polysodium aspartate in the same manner as in Example 1. When the polysodium aspartate was analyzed by the HPLC, a residue of aspartic acid was detected. The yield of polymer was 41%.

Comparative Example 12

The polymerization was performed according to the procedure of Comparative Example 2 while changing the polymerization temperature to 160° C. The polysuccinimide consequently obtained was converted to polysodium aspartate in the same manner as in Example 1. When the polysodium aspartate was analyzed by the HPLC, a residue of aspartic acid was detected. The yield of polymer was 26%.

Comparative Example 13

The polymerization was performed by following the procedure of Comparative Example 1 while changing the polymerization temperature to 240° C. The polysuccinimide consequently obtained was converted to polysodium aspartate in the same manner as in Example 1. When the polysodium aspartate was analyzed by the HPLC, disappearance of aspartic acid was confirmed. The yield of polymer was nearly 100%.

This polyaspartic acid was dialyzed in the same manner as in Example 1 and then tested for biodegradability. The biodegradation rate during the period of 28 days was found to be 38.6%.

Example 10

The NSM-4 strain (FERM P-15560) of *Pseudomonas fluorescens* was inoculated to 10 test tubes each containing 3 ml of a culture medium of the composition shown in Table 2 below and cultured therein at 37° C. for eight hours. The cultured broths obtained in the test tubes were inoculated one each to 10 Sakaguchi flasks each containing 100 ml of a culture medium of composition of Table 2 and shaken cultured at 30° C. overnight. The microorganic cells were recovered from the resultant culture broth by means of centrifugation.

When the cells were tested for aspartase activity, the activity was found to be 0.03 mol L-aspartic acid formed per hour per g of cells.

TABLE 2

| Maleic acid | 10 g |
| Ammonium sulfate | 5 g |
| $KH_2PO_4$ | 1 g |
| $K_2HPO_4$ | 3 g |
| $MgSO_4.7H_2O$ | 0.5 g |
| NaOH | 6.5 g, pH 6.3 |
| Yeast extract | 20 g |

Sterilized with autoclave at 121° C. for 15 minutes

The microrganic cells were immobilized with PAS-880 (made by Nitto Boseki Co., Ltd. in Japan) and an ion-exchange resin (0.5 mm in average particle diameter, made by Japan Organo Co., Ltd. in Japan and sold under the trademark designation of "Amberlite IRA-96SBC1"). As a result, beads of immobilized microorganic cells containing a maleic acid isomerizing enzyme and aspartase were obtained. The activity of the immobilized in forming L-aspartic acid from ammonium maleate was 120 U/ml.

The immobilized mycelium thus prepared was left immersed in an aqueous 20% ammonium maleate solution overnight at 4° C. Then, a column was packed with 100 ml of the wetted immobilized aspartase and the column was coated on the outer face with an insulating material of foamed polystyrene to complete an insulated reactor. To the column, was fed at a flow rate of 2 ml per hour (SV=0.2) via a Teflon tube wrapped with an insulating material kept at 20° C. in a constant temperature bath at 20° C. Such a substrate solution contains 200 g of maleic acid, 170 g of an aqueous 25% ammonia solution, 0.25 g of $MgCO_4.7H_2O$, and 1 ml of mercapto ethanol per liter of water and adjust with ammonia to pH 8.3. When the reaction solution was analyzed three hours after the start of the reaction, it was found to have formed L-aspartic acid in a nearly equimol amount to the consumed maleic acid. The conversion rate of reaction was 99.6%.

In a vat made of stainless steel, 200 ml of the ammonium L-aspartate solution produced through the column was placed and mixed with 11 g of ortho-phosphoric acid. Then, the produced mixture was heated under a reduced pressure in a vacuum dryer at 210° C. for eight hours. The pressure reduction was effected by the evacuation with a diaphragm type vacuum pump, with the degree of pressure reduction adjusted to 150 mmHg. The effluent gas was passed through a trap containing 24 g of maleic acid and 24 ml of water to collect ammonia. After four hours of the reaction, the volume of the liquid in the trap reached about 200 ml owing to the release of ammonia in consequence of the polymerization.

The amount of the polysuccinimide obtained by the polymerization was 38.6 g. The polysuccinimide thus obtained was converted to polysodium aspartate in the same manner as in Example 1. When the weight average molecular weight of this product was determined by the GPC, it was found to be about 7000. When this solution was analyzed by the HPLC, no peak of aspartic acid was detected. The yield of polymer was nearly 100%.

The maleic acid solution that had collected ammonia generated during the polymerization was concentrated under a reduced pressure to 150 ml. The concentrated solution was replenished with 16 g of maleic acid, 31 g of an aqueous 25% ammonia solution, and 0.05 g of $MgSO_4 \cdot 7H_2O$, and 0.15 ml of mercapto ethanol and adjusted with ammonia to a pH 8.3 and a volume of 200 ml. The resultant solution was flowed through the column packed with the immobilized aspartase at a flow rate of 2 ml (SV=0.2) in the same manner as above to effect a continuous reaction. When the reaction solution was analyzed three hours after the start of the reaction, it was found to have formed L-aspartic acid in a nearly equimol amount to the consumed maleic acid. The conversion rate of reaction was 99.7%.

The ammonia collected as described above could be reused in the subsequent cycle of the enzymatic reaction with aspartase.

Example 11

The reaction solution (500 ml) obtained in the same column as in Example 1 and 11.5 g of boric acid were placed in a kneader having an inner volume of 1 liter (available from Irie Shokai K.K. in Japan and sold under the trademark designation of "Bench Kneader PNV-1HS"). The resultant mixture was heated at 190° C. under a reduced pressure. The pressure reduction was effected by the evacuation with a diaphragm type vacuum pump. The effluent gas was passed through a suspension containing 60 g of fumaric acid and 60 ml of water to collect ammonia. After two hours, the fumaric acid was completely dissolved by the ammonia released in consequence of the polymerization. The volume of the liquid reached about 500 ml. The amount of the polysuccinimide obtained by the polymerization was 107 g.

Ten (10) g of this polysuccinimide was suspended in 70 ml of water and, by the addition of an aqueous 10 N sodium hydroxide solution to the resultant suspension, the polysuccinimide in the suspension was dissolved and the pH of the suspension was adjusted to 10. The resultant solution was heated to 90° C. and the gas phase part thereof was blown with nitrogen gas to expel the residual ammonia, with the emanating nitrogen gas passed through the suspension mentioned above. As a result, an aqueous solution of polysodium aspartate was obtained. When this solution was analyzed by HOLC, no peak of aspartic acid was detected. The yield of the polymer was nearly 100%.

The fumaric acid solution that had collected ammonia generated during the polymerization was concentrated under a reduced pressure to 300 ml. The concentrated solution was replenished with 40 g of fumaric acid, 77.5 g of an aqueous 25% ammonia solution, and 0.13 g of $MgSO_4 \cdot 7H_2$ O and consequently adjusted to a pH value of 8.3 and a volume of 500 ml. The resultant solution was flowed through the column packed with the immobilized myceliumm at a flow rate of 5 ml (SV=0.5) in the same manner as above to effect a continuous reaction. When the reaction solution was analyzed three hours after the start of the reaction, it was found to have formed L-aspartic acid in a nearly equimol amount to the consumed fumaric acid. The conversion rate of reaction was 99.7%. The ammonia thus collected could be reused in the subsequent cycle of the enzymatic reaction with mycelium.

While the embodiments or examples of the present invention, as herein disclosed, constitute a preferred form, it is to be understood that other form might be adopted.

The entire disclosure of Japanese Patent Application No. 10-207505 filed on Jul. 23, 1998, and Japanese Patent Application No. 10-207506 filed on Jul. 23, 1998 including specification, claims, drawing and summary are incorporated herein by reference in its entirety.

What is claimed is:

1. A method for the production of a succinimide polymer, which method comprises mixing an ammonium salt of aspartic acid and thermally polymerizing the ammonium salt of aspartic acid in the presence of a boric acid catalyst.

2. A method according to claim 1, further comprising adding an amino acid for copolymerization with the ammonium salt of aspartic acid, the amino acid being at least one selected from the group consisting of glycine, alanine, asparagine, glutamic acid, lysine, valine, leucine, isoleucine, phenyl alanine, methionine, histidine, proline, serine, threonine, and cysteine.

3. A method according to claim 2, wherein the amino acid is at least one member selected from the group consisting of glutamic acid, lysine, methionine, and cysteine.

4. A method according to claim 2, wherein an amount of the amino acid is up to 100 parts by weight, based on the 100 parts by weight of the aspartic acid.

5. A method according to claim 1, wherein said boric acid catalyst is at least one selected from the group consisting of orthoboric acid, metaboric acid, and tetraboric acid.

6. A method according to claim 1, wherein the ammonium salt of aspartic acid is used in the state of aqueous solution, and the acid catalyst is homogeneously dissolved in the aqueous solution.

7. A method according to claim 1, wherein the acid catalyst is used in the range of 0.5 to 40 parts by weight, based on 100 parts by weight of the aspartic acid.

8. A method according to claim 1, wherein the polymerization is carried out at a temperature of 150 to 220° C.

9. A method according to claim 1, wherein the polymerization is carried out at a reduced pressure of 1 to 500 mmHg.

10. A method for the production of an aspartic acid polymer, which method comprises contacting the succinimide polymer produced in claim 1 with a basic substance to hydrolyze.

11. A method for the production of a succinimide polymer, which method comprises:
    thermally polymerizing an ammonium salt of aspartic acid in the presence of an acid catalyst, thereby liberating ammonia,
    collecting the liberated ammonia with at least one liquid selected from the group consisting of a fumaric acid suspension, an acidic fumaric acid solution, a maleic acid solution, and an acidic maleic acid solution, and
    causing the liquid, after having collected the ammonia liberated, to react in the presence of an enzyme to produce L-aspartic acid.

12. A method according to claim 11, wherein the polymerization is carried out by application of heat and under a reduced pressure.

13. A method according to claim 12, wherein the polymerization is carried out by means of at least one selected from the group consisting of a kneader and, a bent type screw extruder, to remove the volatile components therefrom.

14. A method according to claim 11, wherein the polymerization is carried out in the presence of at least one selected from the group consisting of a phosphoric acid derivative having at least one P—OH bond and a boric acid derivative having at least one B—OH bond.

15. A method according to claim 11, wherein the enzyme is an immobilized enzyme.

16. A method according to claim 15, further adding at least one salt of one selected from the group consisting of magnesium, manganese, and cobalt.

17. A method according to claim 15, wherein the enzyme is at least one selected from the group consisting of a microorganism belonging to genus Escherichia, a microorganism belonging to genus Brevibacterium, and a microorganism belonging to genus Pseudomonas.

18. A method according to claim 17, wherein the enzyme is at least one selected from the group consisting of *Escherichia coli* ATCC114404, ATCC9633, ATCC27325, and *Pseudomonas fluorescens* NSM-4 FERMMP-6037.

19. A method according to claim 11, which method further comprises adding an ammonium salt of an amino acid for copolymerization with the ammonium salt of aspartic acid, the amino acid being at least one selected from the group consisting of glycine, alanine, asparagine, glutamic acid, lysine, valine, leucine, isoleucine, phenyl alanine, methionine, histidine, proline, serine, threonine, and cysteine.

20. A method according to claim 19, wherein the amino acid is at least one selected from the group consisting of glutamic acid, lysine, methionine, and cysteine.

21. A method according to claim 20, wherein an amount of the amino acid is up to 100 parts by weight, based on the 100 parts by weight of the aspartic acid.

22. A method for the production of an aspartic acid polymer, which method comprises contacting the succinimide polymer produced in claim 11 with a basic substance to hydrolyze.

* * * * *